US010591734B2

United States Patent
Matsuki et al.

(10) Patent No.: US 10,591,734 B2
(45) Date of Patent: *Mar. 17, 2020

(54) DISPLAY APPARATUS

(71) Applicant: SEIKO EPSON CORPORATION, Tokyo (JP)

(72) Inventors: Hayato Matsuki, Suwa (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 85 days.

This patent is subject to a terminal disclaimer.

(21) Appl. No.: 15/922,175

(22) Filed: Mar. 15, 2018

(65) Prior Publication Data

US 2018/0284443 A1    Oct. 4, 2018

(30) Foreign Application Priority Data

Mar. 28, 2017    (JP) .................................. 2017-062396

(51) Int. Cl.
*G02B 27/01*    (2006.01)
*G02B 27/09*    (2006.01)
(Continued)

(52) U.S. Cl.
CPC ....... *G02B 27/0172* (2013.01); *G02B 6/0001* (2013.01); *G02B 6/002* (2013.01);
(Continued)

(58) Field of Classification Search
CPC ................................. G02B 27/0172; G02B 6/0045; G02B 6/0035; G02B 6/002; G02B 27/0955;
(Continued)

(56) References Cited

U.S. PATENT DOCUMENTS 7,418,170 B2    8/2008    Mukawa et al.
8,873,150 B2    10/2014   Amitai
(Continued)

FOREIGN PATENT DOCUMENTS

JP    2012-198393 A    10/2012
JP    2014-112245 A    6/2014
(Continued)

*Primary Examiner* — Tuyen Tra
(74) *Attorney, Agent, or Firm* — Oliff PLC

(57) ABSTRACT

A display apparatus includes an image generation system that emits image light beams as non-parallel light beams, and a light guide system on which the image light beams emitted from the image generation system are incident without passing through a projection lens system. The light guide system includes a transparent light-incident portion that includes a light-incident surface on which the image light beams are incident and which is a curved surface, and a plurality of reflection surfaces which convert the image light beams incident from the light-incident surface into parallel light beams and are curved surfaces, and a transparent light guide portion of which one end side in a first direction is connected to the light-incident portion. In the light guide portion, the image light beams incident from the light-incident portion are reflected between a first surface and a second surface, and are guided to a light-emitting portion.

17 Claims, 11 Drawing Sheets

(51) Int. Cl.
*F21V 8/00* (2006.01)
*G02B 6/42* (2006.01)

(52) U.S. Cl.
CPC ......... *G02B 6/0035* (2013.01); *G02B 6/0045* (2013.01); *G02B 6/4204* (2013.01); *G02B 27/0955* (2013.01); *G02B 2027/0125* (2013.01); *G02B 2027/0178* (2013.01)

(58) Field of Classification Search
CPC ............... G02B 6/4204; G02B 6/0001; G02B 2027/0125; G02B 2027/0178
USPC .................................. 359/618, 629, 630, 631
See application file for complete search history.

(56) References Cited

U.S. PATENT DOCUMENTS

| | | | |
|---|---|---|---|
| 9,248,616 B2 | 2/2016 | Amitai | |
| 9,915,823 B1 * | 3/2018 | Kress | G02B 27/0172 |
| 10,139,634 B2 * | 11/2018 | Matsuki | G02B 27/0172 |
| 2017/0184859 A1 | 6/2017 | Takagi et al. | |
| 2017/0219830 A1 | 8/2017 | Komatsu et al. | |
| 2017/0293143 A1 | 10/2017 | Martinez et al. | |
| 2017/0293144 A1 * | 10/2017 | Cakmakci | G02B 27/01 |
| 2018/0284444 A1 | 10/2018 | Matsuki et al. | |

FOREIGN PATENT DOCUMENTS

| | | | |
|---|---|---|---|
| JP | 5698297 B2 | 4/2015 | |
| JP | 2017-003845 A | 1/2017 | |

\* cited by examiner

DISPLAY APPARATUS

BACKGROUND

1. Technical Field

The present disclosure relates to a display apparatus including a light guide system.

2. Related Art

As a display apparatus, a configuration including a light guide system in which a light guide portion is connected to a light-incident portion on which image light beams are incident, has been proposed (refer to JP-A-2017-3845). In the display apparatus described in JP-A-2017-3845, the image light beams emitted from an image generation system are incident on the light-incident portion via a projection lens system.

In the display apparatus, a reduction in size and weight is required. However, in the configuration described in JP-A-2017-3845, it is necessary to provide a projection lens system between the image generation system and the light guide system, and as a result, it is difficult to realize a reduction in size and weight.

SUMMARY

An advantage of some aspects of the embodiment is to provide a display apparatus that can be reduced in size and weight.

In order to realize the advantage, according to an aspect of the embodiment, there is provided a display apparatus including: an image generation system that emits image light beams as non-parallel light beams; and a light guide system on which the image light beams emitted from the image generation system are incident without passing through a projection lens system, in which the light guide system including a transparent light-incident portion that includes a light-incident surface on which the image light beams are incident and the light-incident surface is a curved surface, and a plurality of reflection surfaces which convert the image light beams incident from the light-incident surface into parallel light beams and each of the plurality of reflection surfaces is curved surfaces, and a transparent light guide portion of which one end side in a first direction is connected to the light-incident portion, in which the light guide portion including a first surface that extends from the one end side toward another end side in the first direction, and a second surface that faces the first surface on one side of a second direction intersecting with the first direction, the light guide portion has a light-emitting portion that is provided at a portion of the second surface away from the light-incident portion, and in which the parallel light beams emitted from the light-incident portion to the light guide portion are reflected between the first surface and the second surface, and are guided to the light-emitting portion.

In the display apparatus, the image light beams as non-parallel light beams emitted from the image generation system are incident on the light-incident surface of the light-incident portion of the light guide system without passing through a projection lens system, are reflected by the plurality of reflection surfaces of the light-incident portion, and then are converted into parallel light beams. Thus, the parallel image light beams are reflected between the first surface and the second surface of the light guide portion, travel through the light guide portion, and are emitted from the light-emitting portion. Therefore, even when a projection lens system is not provided, the image light beams can be emitted from the light-emitting portion, and thus a size and a weight of the display apparatus can be reduced.

BRIEF DESCRIPTION OF THE DRAWINGS

The embodiment will be described with reference to the accompanying drawings, wherein like numbers reference like elements.

DESCRIPTION OF EXEMPLARY EMBODIMENTS

Figure 1:
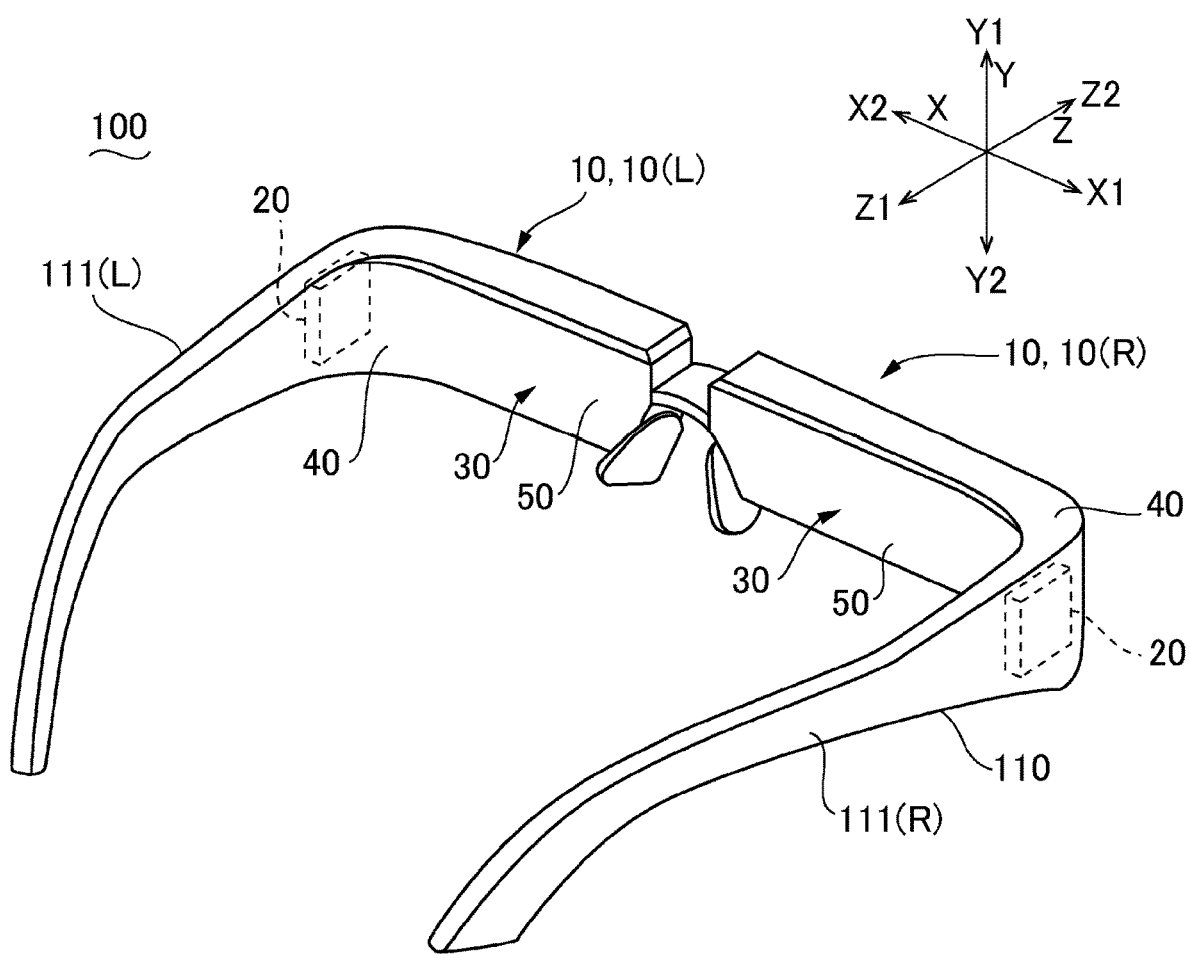
FIG. 1 is an explanatory view schematically illustrating an example of an appearance of a display apparatus according to a first embodiment.

Hereinafter, embodiments according to the invention will be described. In the drawings to be referred to in the following description, in order to make each layer and each member to be recognizable on the drawings, the number and the scale of each layer and each member are made different.

First Embodiment

Overall Configuration

FIG. 1 is an explanatory view schematically illustrating an example of an appearance of a display apparatus 100 according to a first embodiment. The display apparatus 100 illustrated in FIG. 1 is configured with a see-through type eye glass display or the like, and includes a frame 110 provided with temples 111(R) and 111(L) on left and right sides thereof. In the display apparatus 100, a display unit 10 to be described is supported by the frame 110, and an image emitted from the display unit 10 is recognized by a user, as a virtual image. In the present embodiment, the display apparatus 100 includes a right-eye display unit 10(R) and a left-eye display unit 10(L) as the display unit 10. The right-eye display unit 10(R) and the left-eye display unit 10(L) have the same configuration, and are disposed symmetrically in a right-left direction. Thus, in the following description, the right-eye display unit 10(R) will be mainly described, and a description of the left-eye display unit 10(L) will be omitted.

In the following description, a right-left direction is referred to as a first direction X, a front-rear direction is referred to as a second direction Z, and a upper-and-lower direction is referred to as a third direction Y. In addition, one side (right side) in the first direction X is referred to as X1, the other side (left side) in the first direction X is referred to as X2, one side (rear side) in the second direction Z is referred to as Z1, the other side (front side) in the second direction Z is referred to as Z2, one side (upper side) in the third direction Y is referred to as Y1, and the other side (lower side) in the third direction Y is referred to as Y2. Here, since the right-eye display unit 10(R) and the left-eye display unit 10(L) are disposed symmetrically, in the right-eye display unit 10(R) and the left-eye display unit 10(L), one side X1 and the other side X2 in the first direction X are reversed to each other in a right-left direction.

Overall Configuration of Display Unit 10

Figure 2:
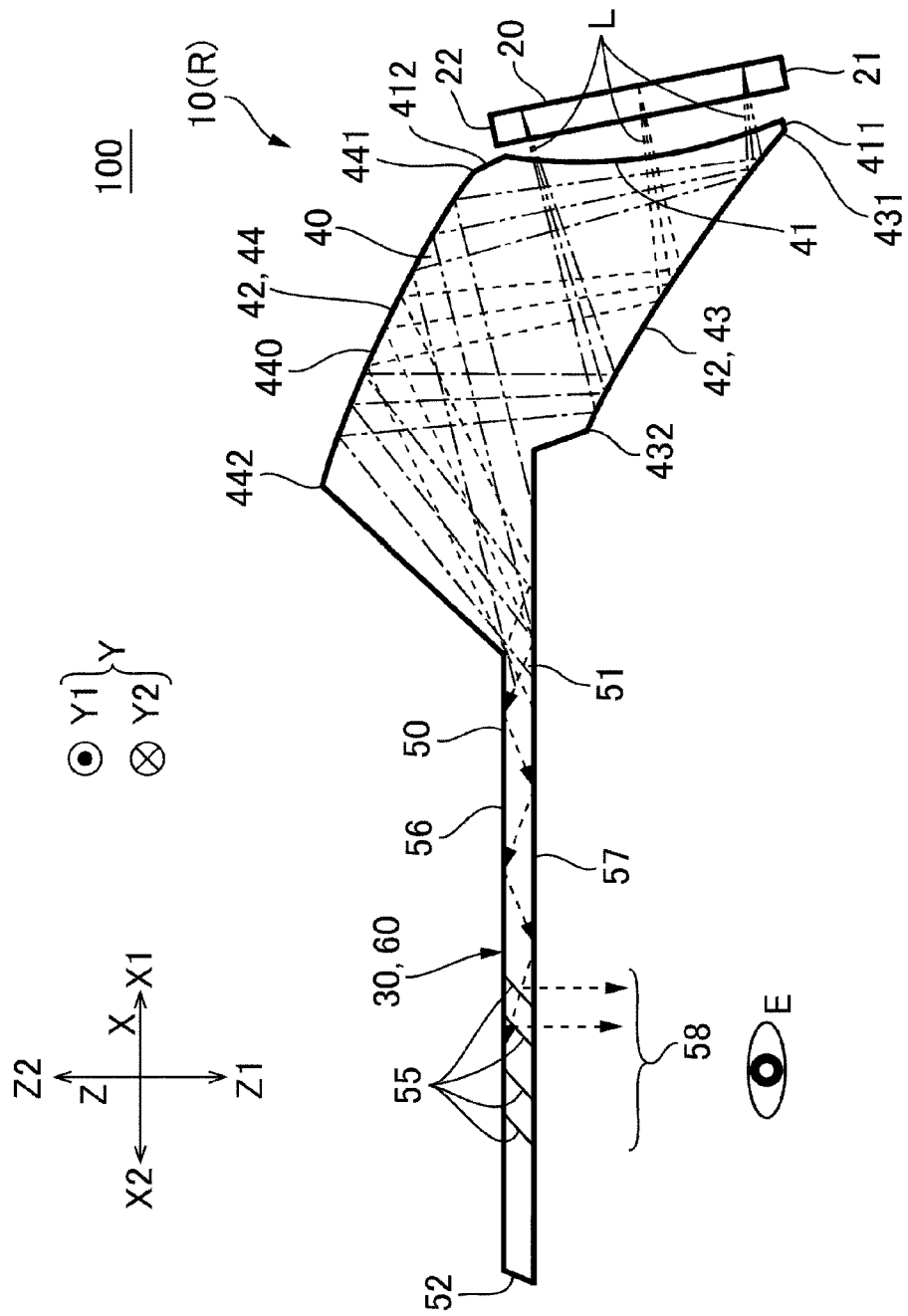
FIG. 2 is a plan view of an optical system of the display apparatus illustrated in FIG. 1.

FIG. 2 is a plan view of an optical system of the display unit 10 illustrated in FIG. 1. In FIG. 2, image light beams L emitted from the center of an image generation system 20 are illustrated by dotted lines, and image light beams L emitted from end portions of the image generation system 20 are illustrated by one-dot chain lines and two-dot chain lines.

As illustrated in FIG. 2, the display unit 10 (right-eye display unit 10(R)) includes an image generation system 20 that emits image light beams L as non-parallel light beams and a light guide system 30 through which the image light beams L emitted from the image generation system 20 are incident without passing through a projection lens system and are guided to a light-emitting portion 58.

The light guide system 30 includes a transparent light-incident portion 40 including a light-incident surface 41 and a plurality of reflection surfaces 42, and a transparent light guide portion 50 of which one end 51 side in the first direction X (end portion in one side X1) is connected to the light-incident portion 40, the light-incident surface 41 on which the image light beams L are incident and which is made of a curved surface, and the plurality of reflection surfaces 42 which convert the image light beams L incident from the light-incident surface 41 into parallel light beams and which are made of curved surfaces. The light guide portion 50 includes a first surface 56 extending from the one end 51 side toward the other end 52 side in the first direction X (end portion in the other side X2), a second surface 57 facing the first surface 56 in one side Z1 of the second direction Z intersecting with the first direction X, and the light-emitting portion 58 which is provided at a portion of the second surface 57 that is away from the light-incident portion 40. In the present embodiment, the light-emitting portion 58 is a portion of the second surface 57 that is away from the light-incident portion 40 in the other side X2 of the first direction X. In the light guide system 30 with this configuration, the parallel light beams emitted from the light-incident portion 40 to the light guide portion 50 are reflected between the first surface 56 and the second surface 57, are guided to the light-emitting portion 58 from one side X1 to the other side X2 in the first direction X, and are emitted from the light-emitting portion 58. In the present embodiment, the light-incident portion 40 and the light guide portion 50 are configured with an integrated member 60.

Detailed Configuration of Image Generation System 20

The image generation system 20 is an optical modulation panel configured with a liquid crystal device, an organic electroluminescence device, or the like, and is disposed so as to face the light-incident surface 41 in one side X1 of the first direction X with respect to the light-incident portion 40. In the present embodiment, the image generation system 20 is disposed obliquely such that an end portion 21 thereof in one side Z1 of the second direction Z is positioned toward one side X1 of the first direction X than the other end portion 22 thereof in the other side Z2 of the second direction Z is.

Detailed Configuration of Light-Incident Portion 40

In the light-incident portion 40, the light-incident surface 41 is a surface of the light-incident portion 40 that is positioned toward one side X1 of the first direction X, and faces the image generation system 20 without passing through a projection lens system. Thus, the light-incident surface 41 is disposed obliquely such that an end portion 411 in one side Z1 of the second direction Z is positioned toward one side X1 of the first direction X than an end portion 412 in the other side Z2 of the second direction Z is. The light-incident surface 41 is made of a curved surface such as an aspherical surface or a free curved surface, and in the present embodiment, the light-incident surface 41 is made of a concave-shaped free curved surface.

As the plurality of reflection surfaces 42, a first light-reflective curved surface 43 and a second light-reflective curved surface 44 are formed on the light-incident portion 40. The first light-reflective curved surface 43 is a surface toward one side Z1 of the second direction Z, and is disposed obliquely such that an end portion 431 in one side X1 of the first direction X is positioned toward one side Z1 of the second direction Z than an end portion 432 in the other side X2 of the first direction X is. The first light-reflective curved surface 43 is made of a curved surface such as an aspherical surface or a free curved surface, and in the present embodiment, the first light-reflective curved surface 43 is made of a concave-shaped free curved surface. Although a reflection film or the like is not formed on the first light-reflective curved surface 43, the first light-reflective curved surface 43 totally reflects light beams which are incident at an incident angle equal to or larger than a critical angle.

The second light-reflective curved surface 44 is a surface toward the other side Z2 of the second direction Z, and faces the first light-reflective curved surface 43. The second light-reflective curved surface 44 is disposed obliquely such that an end portion 441 in one side X1 of the first direction X is positioned toward one side Z1 of the second direction Z than an end portion 442 in the other side X2 of the first direction X is. The second light-reflective curved surface 44 is made of a curved surface such as an aspherical surface or a free curved surface, and in the present embodiment, the second light-reflective curved surface 44 is made of a convex-shaped free curved surface. The second light-reflective curved surface 44 may employ a configuration in which a reflection film or the like is not formed and light beams incident at an incident angle equal to or larger than a critical angle are totally reflected. Here, in the present embodiment, the second light-reflective curved surface 44 is provided with a reflective metal layer 440 including aluminum, silver, magnesium, chromium, or the like as a main component.

In the light-incident portion 40 with this configuration, when the image light beams L as non-parallel light beams emitted from the image generation system 20 are incident on the light-incident surface 41, the image light beams L incident from the light-incident surface 41 are directed toward the first light-reflective curved surface 43. Next, the image light beams L are reflected by the first light-reflective curved surface 43, and are directed again toward the second light-reflective curved surface 44. Next, the image light beams L are reflected by the second light-reflective curved surface 44 toward the light guide portion 50, and the image light beams L are converted into parallel light beams in the meantime.

Detailed Configuration of Light Guide Portion 50

In the light guide portion 50, the first surface 56 and the second surface 57 are disposed in parallel. The first surface 56 and the second surface 57 totally reflect the light beams which are incident at an incident angle equal to or larger than a critical angle, according to a difference in refractive index between the light guide portion 50 and the outside (air). Therefore, a reflection film or the like is not formed on the first surface 56 (a first reflection surface) and the second surface 57 (a second reflection surface).

In a portion of the light guide portion 50 that is away from the light-incident portion 40, a plurality of partial reflection layers 55 are disposed parallel to each other along the first direction X, the partial reflection layers 55 being inclined toward one side X1 of the first direction X from a normal direction with respect to the second surface 57 when viewed from the third direction Y. The light-emitting portion 58 is a portion of the second surface 57 that overlaps with the plurality of partial reflection layers 55 in the first direction X, and is a region with a predetermined width in the first direction X.

Each of the plurality of partial reflection layers 55 is made of a dielectric multilayer film. In addition, at least one partial reflection layer among the plurality of partial reflection layers 55 may be a composite multilayer film of a dielectric multilayer film and a reflective metal layer (thin film) including aluminum, silver, magnesium, chromium, or the like as a main component. In a case where the partial reflection layer 55 is configured to include a metal layer, there is an effect in that a reflectance of the partial reflection layer 55 can be increased and in that an incident angle dependence and a polarization dependence on a transmittance and a reflectance of the partial reflection layer 55 can be optimized.

In the light guide portion 50 with this configuration, the image light beams L as parallel light beams which are incident from the light-incident portion 40 are reflected between the first surface 56 and the second surface 57, and travel from one side X1 to the other side X2 in the first direction X. A part of the image light beams L incident on the partial reflection layer 55 is reflected by the partial reflection layer 55, and is emitted from the light-emitting portion 58 toward an eye E of an observer. In addition, the rest of the image light beams L incident on the partial reflection layer 55 are transmitted through the partial reflection layer 55, and are incident on the next partial reflection layer 55 which is adjacent to the partial reflection layer 55 in the other side X2 of the first direction X. Therefore, in each of the plurality of partial reflection layers 55, the image light beams L reflected toward one side Z1 of the second direction Z are emitted from the light-emitting portion 58 toward the eye E of the observer. As a result, the observer can recognize a virtual image. At that time, when light beams are incident from the outside to the light guide portion 50, the light beams are incident on the light guide portion 50, are transmitted through the partial reflection layers 55, and reach the eye E of the observer. Therefore, the observer can see the image generated by the image generation system 20, and can see a scenery or the like of the outside in a see-through manner.

State of Parallel Light Flux in Light Guide Portion 50

Figure 3:
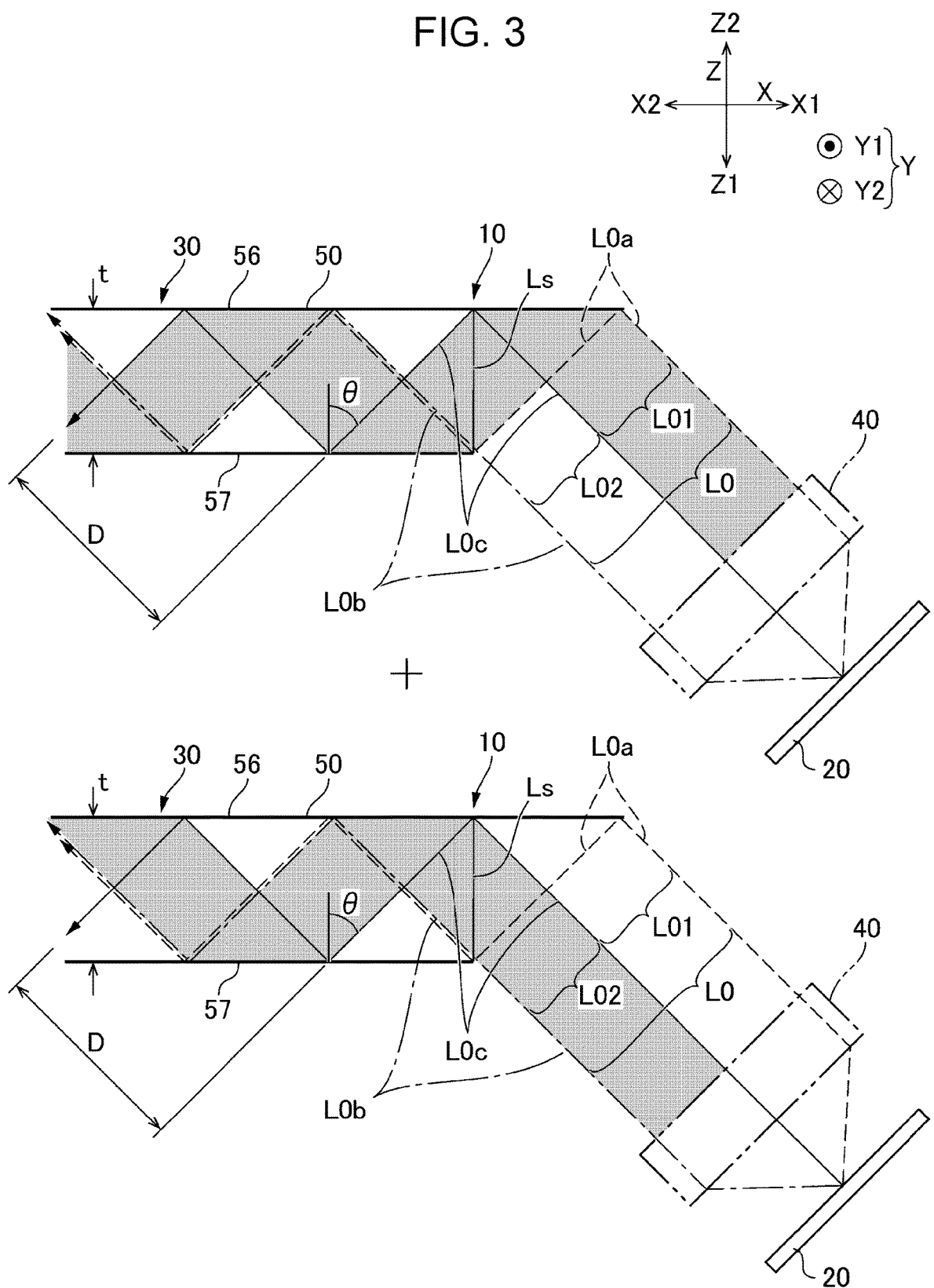
FIG. 3 is an explanatory diagram schematically illustrating a state of a parallel light flux in a light guide portion illustrated in FIG. 2.

FIG. 3 is an explanatory diagram schematically illustrating a state of a parallel light flux in the light guide portion 50 illustrated in FIG. 2, and schematically illustrates a state where a non-parallel light flux is converted into a parallel light flux L0 (image light beam L) by the light-incident portion 40 and then the parallel light flux L0 is viewed from the third direction Y, the non-parallel light flux being incident on the light-incident surface 41 of the light-incident portion 40 from the same portion of the image generation system 20. In FIG. 3, a center light beam L0c of the parallel light flux L0 is illustrated by a solid line, a first light beam L0a which is positioned at one end portion of the parallel light flux L0 is illustrated by a long broken line, and a second light beam L0b which is positioned at the other end portion of the parallel light flux L0 is illustrated by a one-dot chain line. In addition, in an upper portion of FIG. 3, a first parallel light flux portion L01 interposed between the center light beam L0c and the first light beam L0a is illustrated by a gray color, and in a lower portion of FIG. 3, a second parallel light flux portion L02 interposed between the center light beam L0c and the second light beam L0b is illustrated by a gray color.

As illustrated in FIG. 3, in the display unit 10, when the non-parallel light flux is converted into a parallel light flux L0 by the light-incident portion 40 and then the parallel light flux L0 is viewed from the third direction Y, the non-parallel light flux being incident on the light-incident surface 41 of the light-incident portion 40 from the same portion of the image generation system 20, the inside of one end portion (a portion in one side X1 of the first direction X) of the light guide portion 50 at which the light-incident portion 40 is positioned is filled with the parallel light flux L0. More specifically, in the parallel light flux L0, when the first parallel light flux portion L01 (gray portion) interposed between the center light beam L0c and the first light beam L0a is combined with the second parallel light flux portion L02 (gray portion) interposed between the center light beam L0c and the second light beam L0b of the parallel light flux L0, the inside of the light guide portion 50 is filled with the parallel light flux L0.

For example, assuming that the first surface 56 and the second surface 57 are parallel to each other, that a light flux diameter of the parallel light flux L0 is D, that a distance between the first surface 56 and the second surface 57 in the second direction Z is t, and that an incident angle of the parallel light flux L0 with respect to the first surface 56 and the second surface 57 is θ, such a configuration can be realized by setting the light flux diameter D, the distance t, and the incident angle θ so as to satisfy the following conditional equation.

$$D = 2t \times \sin \theta$$

In other words, positions at which the first light beam L0a and the second light beam L0b are incident on the second surface 57 are set so as to be positioned on an imaginary normal line Ls at a position at which the center light beam L0c is incident on the first surface 56, and thus the configuration can be realized. As illustrated in FIG. 2, although the image light beams L are emitted from each portion of the image generation system 20, in the present embodiment, the image light beams L emitted from each portion of the image generation system 20 satisfy the above condition.

Main Effect of Present Embodiment

As described above, in the display apparatus 100 (display unit 10) according to the present embodiment, the image light beams L as non-parallel light beams emitted from the image generation system 20 are incident on the light-incident surface 41 of the light-incident portion 40 of the light guide system 30 without passing through a projection lens system, are reflected by the plurality of reflection surfaces 42 of the light-incident portion 40, and then are converted into parallel light beams. Thus, the parallel image light beams are reflected between the first surface 56 and the second surface 57 of the light guide portion 50, travel through the light guide portion 50, and are emitted from the light-emitting portion 58. Therefore, even when a projection lens system is not provided, the image light beams as parallel light beams can be emitted from the light-emitting portion 58 to the eye E of the observer, and thus the observer can recognize a virtual image. In addition, there is no need to provide a projection lens system, and thus a size and a weight of the display apparatus 100 can be reduced. Further, there is no need to provide a projection lens system, and thus a design of the display apparatus 100 can be enhanced.

In addition, in the display apparatus 100 (display unit 10), when the non-parallel light flux is converted into a parallel light flux L0 by the light-incident portion 40 and then the parallel light flux L0 is viewed from the third direction Y, the non-parallel light flux being incident on the light-incident surface 41 of the light-incident portion 40 from the same portion of the image generation system 20, the inside of the portion of the light guide portion 50 in one side X1 of the first direction X is filled with the parallel light flux L0. Therefore, even when the light guide portion 50 is made so as to have a small thickness in the second direction Z, the observer can recognize a virtual image with high brightness.

In addition, in the light guide portion 50, the plurality of partial reflection layers 55 are disposed along the first direction X in parallel with each other, and the light-emitting portion 58 is a portion at which the second surface 57 overlaps with the plurality of partial reflection layers 55 in the first direction X. Therefore, since the light-emitting portion 58 is a region with a predetermined width in the first direction X, even in a case where a position of the eye E of the observer moves slightly in the first direction X, the observer can recognize a virtual image.

In addition, in the light-incident portion 40, one surface of the plurality of reflection surfaces 42 includes a metal layer. In the present embodiment, among the plurality of reflection surfaces 42, the second light-reflective curved surface 44, which converts the image light beams L into parallel light beams and reflects the parallel light beams toward the light guide portion 50, includes a metal layer 440. Thus, even in a case where the incident angle with respect to the second light-reflective curved surface 44 is small, the second light-reflective curved surface 44 can reliably reflect the incident light beams. Therefore, the observer can recognize a virtual image with high brightness.

Second Embodiment

Figure 4:
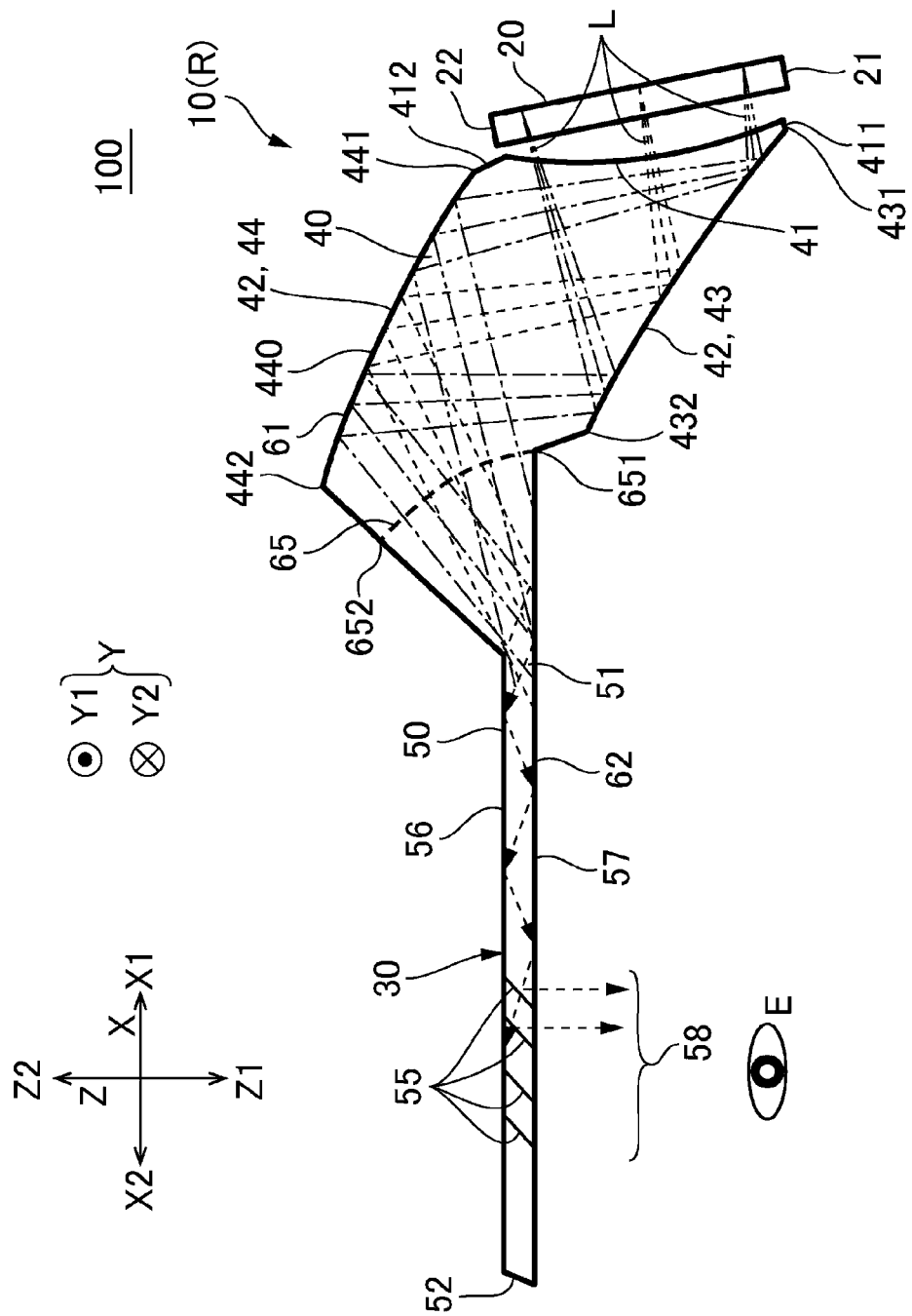
FIG. 4 is a plan diagram of the optical system of the display apparatus according to a second embodiment.

FIG. 4 is a plan diagram of the optical system of the display apparatus 100 according to a second embodiment. Since the basic configuration of the present embodiment and each embodiment to be described is the same as that of the first embodiment, the same reference numerals are given to the common portions, and a description thereof will be omitted.

As illustrated in FIG. 4, similar to the first embodiment, the display unit 10 according to the present embodiment includes the image generation system 20 that emits image light beams L as non-parallel light beams and the light guide system 30 through which the image light beams L emitted from the image generation system 20 are incident without passing through a projection lens system and are guided to the light-emitting portion. The light guide system 30 includes the transparent light-incident portion 40 including the light-incident surface 41 and the plurality of reflection surfaces 42, and the transparent light guide portion 50 of which one end 51 side in the first direction X is connected to the light-incident portion 40, the light-incident surface 41 on which the image light beams L are incident and which is made of a curved surface, and the plurality of reflection surfaces 42 which convert the image light beams L incident from the light-incident surface 41 into parallel light beams and which are made of curved surfaces.

In the light guide system 30 with this configuration, although the light-incident portion 40 and the light guide portion 50 are configured with an integrated member 60 in the first embodiment, in the present embodiment, at least a portion of the light-incident portion 40 is formed of a first transparent member 61, and the light guide portion 50 is formed of a second transparent member 62 which is surface-bonded to the first transparent member 61. Thus, the light-incident portion 40 and the partial reflection layers 55 can be manufactured by an appropriate method. For example, the light-incident portion 40 is configured with a resin molded component, while the light guide portion 50 is configured by stacking transparent substrates with the partial reflection layers 55 interposed therebetween and cutting the transparent substrates.

Here, on a bonding surface 65 between the first transparent member 61 and the second transparent member 62, a first end portion 651 in one side Z1 of the second direction Z is positioned between the second surface 57 and a reflection region of the light-incident portion 40, and a second end portion 652 in the other side Z2 of the second direction Z is positioned between the first surface 56 and the reflection region of the light-incident portion 40. More specifically, the first end portion 651 of the bonding surface 65 is positioned between the region (reflection region) of the first light-reflective curved surface 43 on which the image light beams L are incident from the light-incident surface 41 and the second surface 57. In addition, the second end portion 652 of the bonding surface 65 is positioned between the region (reflection region) of the second light-reflective curved surface 44 on which the image light beams L are incident from the first light-reflective curved surface 43 and the first surface 56. Therefore, the bonding surface 65 is less likely to hinder appropriate reflection in the light-incident portion 40 and appropriate reflection in the light guide portion 50.

In the present embodiment, the bonding surface 65 is made of a curved surface. In addition, the first transparent member 61 and the second transparent member 62 have refractive indexes and Abbe numbers different from each other, and the bonding surface 65 between the first transparent member 61 and the second transparent member 62 is made of a curved surface. For example, in a visible light wavelength region, a refractive index of the first transparent member 61 is 1.585, an Abbe number of the first transparent member 61 is 30, a refractive index of the second transparent member 62 is 1.531, and an Abbe number of the second transparent member 62 is 56. The bonding surface 65 is a concave curved surface which is concave toward the light-incident portion 40. Thus, the bonding surface 65 is configured to function as a lens surface having a negative power.

Therefore, the bonding surface 65 functions as a lens that performs a part of a role of converting the image light beams L into parallel light beams. As a result, as in the present embodiment, even when a projection lens system is not used, design requirements for the light-incident portion 40 can be relaxed, and chromatic aberration or the like can be reduced. In this configuration, since the bonding surface 65 performs a part of the role of converting the image light beams L into parallel light beams, the bonding surface 65 is included in the light-incident portion 40. In order to make the bonding surface 65 function as a lens surface having a negative power, the bonding surface 65 may be made of a concave curved surface which is concave toward the light guide portion 50, and a refractive index of the light guide portion 50 may be set to a refractive index smaller than that of the light-incident portion 40.

Third Embodiment

Figure 5:
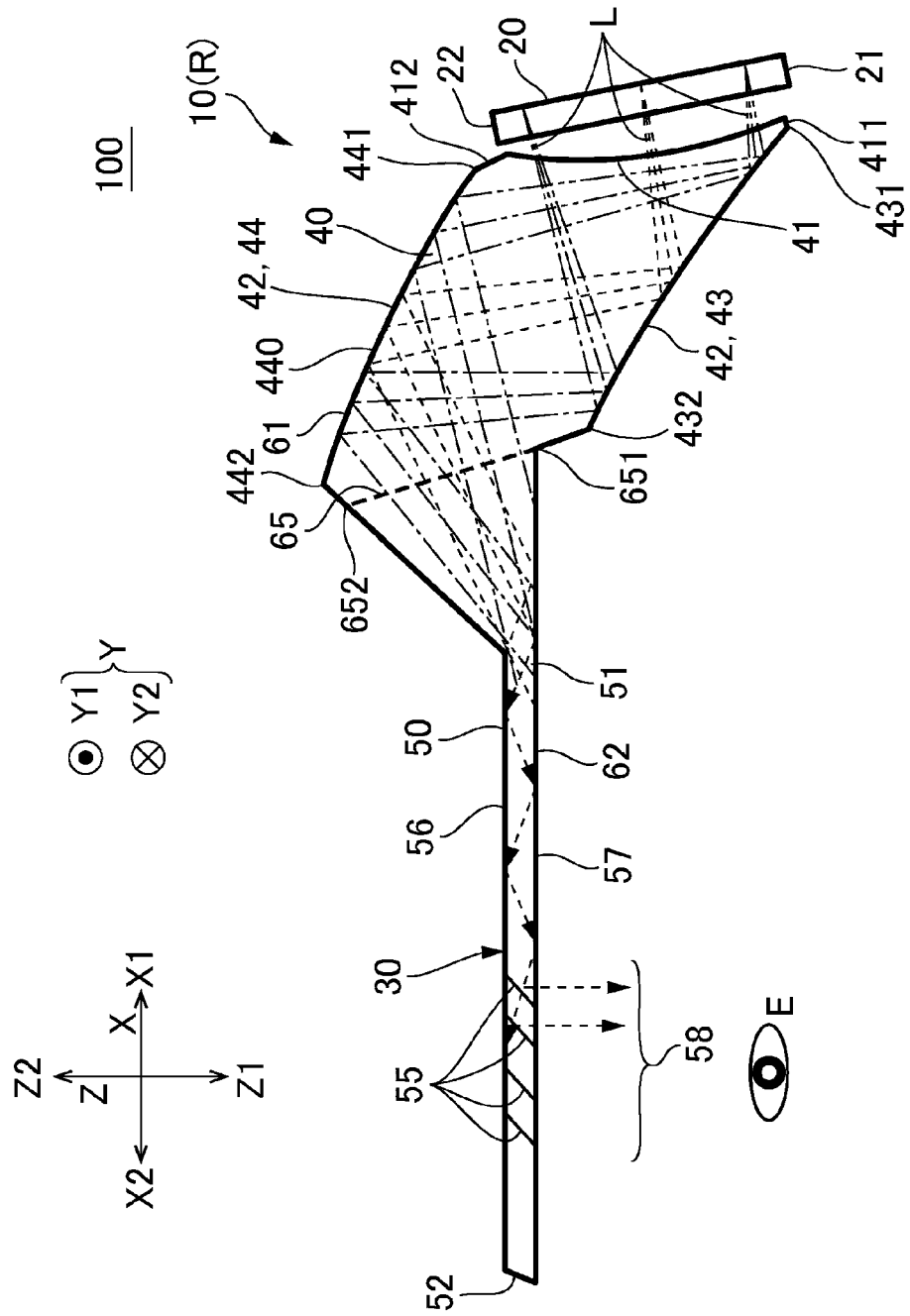
FIG. 5 is a plan diagram of the optical system of the display apparatus according to a third embodiment.

FIG. 5 is a plan diagram of the optical system of the display apparatus 100 according to a third embodiment. As illustrated in FIG. 5, similar to the first embodiment and the second embodiment, the display unit 10 according to the present embodiment includes the image generation system 20 that emits image light beams L as non-parallel light beams and the light guide system 30 through which the image light beams L emitted from the image generation system 20 are incident without passing through a projection lens system and are guided to the light-emitting portion. The light guide system 30 includes the transparent light-incident portion 40 including the light-incident surface 41 and the plurality of reflection surfaces 42, and the transparent light guide portion 50 of which one end side in the first direction X (end portion 51 in one side X1) is connected to the light-incident portion 40, the light-incident surface 41 on which the image light beams L are incident and which is made of a curved surface, and the plurality of reflection surfaces 42 which convert the image light beams L incident from the light-incident surface 41 into parallel light beams and which are made of curved surfaces.

In the light guide system 30 with this configuration, in the present embodiment, at least a portion of the light-incident portion 40 is formed of the first transparent member 61, and the light guide portion 50 is formed of the second transparent member 62 which is surface-bonded to the first transparent member 61. In addition, on the bonding surface 65 between the first transparent member 61 and the second transparent member 62, the first end portion 651 in one side Z1 of the second direction Z is positioned between the second surface 57 and a reflection region of the light-incident portion 40, and the second end portion 652 in the other side Z2 of the second direction Z is positioned between the first surface 56 and the reflection region of the light-incident portion 40.

In the present embodiment, the first transparent member 61 and the second transparent member 62 have refractive indexes and Abbe numbers different from each other. For example, in a visible light wavelength region, a refractive index of the first transparent member 61 is 1.585, an Abbe number of the first transparent member 61 is 30, a refractive index of the second transparent member 62 is 1.531, and an Abbe number of the second transparent member 62 is 56. In addition, the bonding surface 65 between the first transparent member 61 and the second transparent member 62 is a flat surface, and the image light beams L, which are converted into parallel light beams by the light-incident portion 40, are transmitted through the bonding surface 65. Therefore, the entire light-incident portion 40 is configured with the first transparent member 61, the light guide portion 50 is configured with the second transparent member 62, and the bonding surface 65 is positioned between the light-incident portion 40 and the light guide portion 50.

In the light guide system 30 with this configuration, chromatic aberration or the like can be reduced by refraction on the bonding surface 65. Therefore, even when the chromatic aberration cannot be reduced due to the projection lens system, as in the present embodiment, the observer can recognize a virtual image with high resolution. In the present embodiment, although the bonding surface 65 is inclined with respect to the second surface 57 in an opposite direction as the partial reflection layer 55 is inclined, depending on a configuration of the light-incident portion 40, a configuration in which the bonding surface 65 is inclined with respect to the second surface 57 in the same direction as that of the partial reflection layer 55, may be adopted. In this case, the bonding surface 65 and the partial reflection layer 55 may be parallel to each other, or the bonding surface 65 and the partial reflection layer 55 may be non-parallel to each other.

Fourth Embodiment

Figure 6:
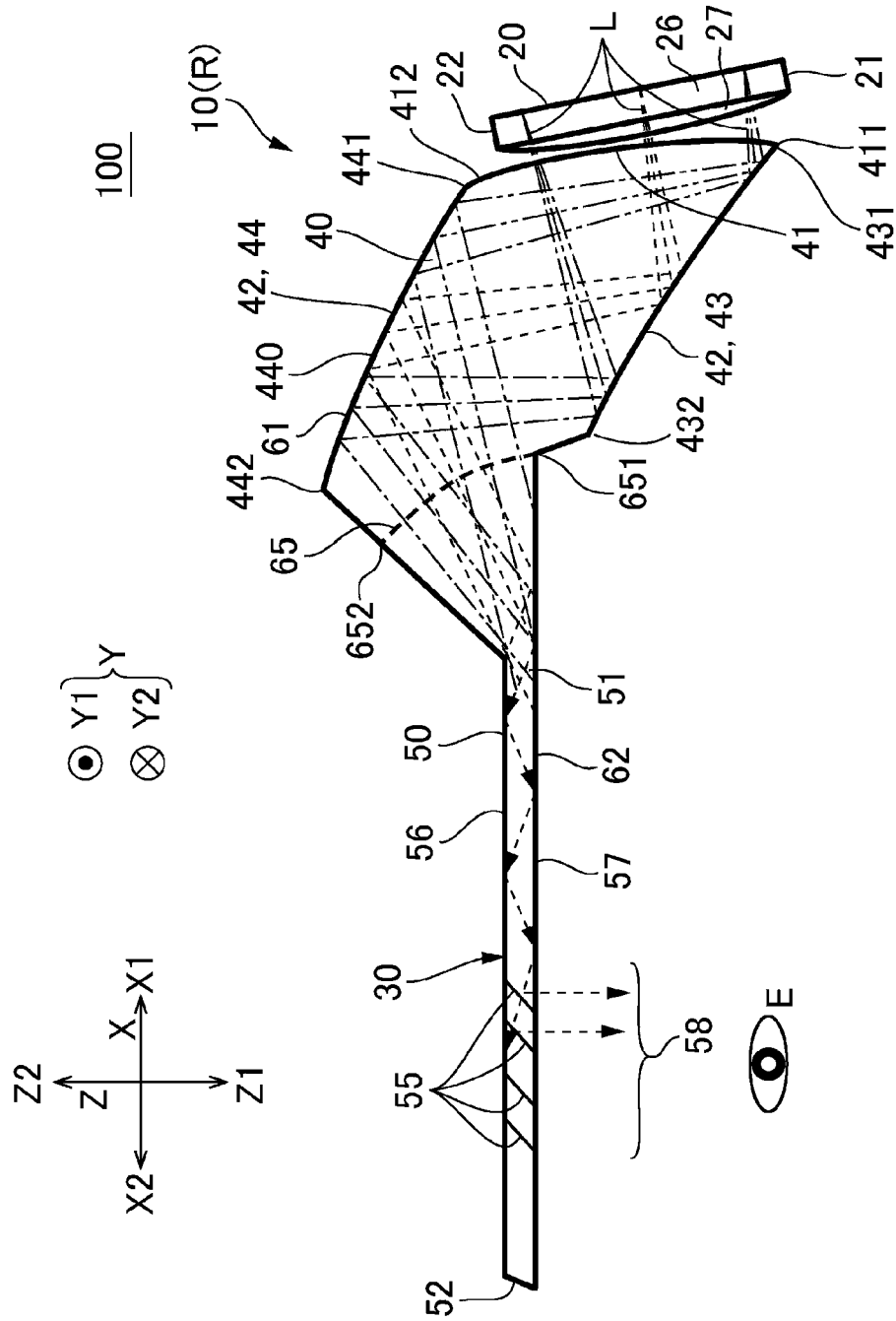
FIG. 6 is a plan diagram of the optical system of the display apparatus according to a fourth embodiment.

FIG. 6 is a plan diagram of the optical system of the display apparatus 100 according to a fourth embodiment. As illustrated in FIG. 6, similar to the first embodiment and the second embodiment, the display unit 10 according to the present embodiment includes the image generation system 20 that emits image light beams L as non-parallel light beams and the light guide system 30 through which the image light beams L emitted from the image generation system 20 are incident without passing through a projection lens system and are guided to the light-emitting portion. The light guide system 30 includes the transparent light-incident portion 40 including the light-incident surface 41 and the plurality of reflection surfaces 42, and the transparent light guide portion 50 of which one end side in the first direction X (end portion 51 in one side X1) is connected to the light-incident portion 40, the light-incident surface 41 on which the image light beams L are incident and which is made of a curved surface, and the plurality of reflection surfaces 42 which convert the image light beams L incident from the light-incident surface 41 into parallel light beams and which are made of curved surfaces.

Here, the image generation system 20 includes an optical modulation panel 26 for generating an image and a lens element 27 fixed on a surface of the optical modulation panel 26 from which the image light beams L are emitted. Other configurations are the same as in the second embodiment. In the display unit 10 with this configuration, the lens element 27 included in the image generation system 20 performs a part of the role of converting the image light beams L into parallel light beams, and thus design requirements for the light-incident portion 40 can be relaxed. In the present embodiment, although the light-incident surface 41 is a convex curved surface, similar to the first embodiment, the light-incident surface 41 may be a concave curved surface. In addition, the configuration according to the present embodiment is not limited to the second embodiment, and may be applied to the first embodiment, the third embodiment, and the like.

Fifth Embodiment

Figure 7:
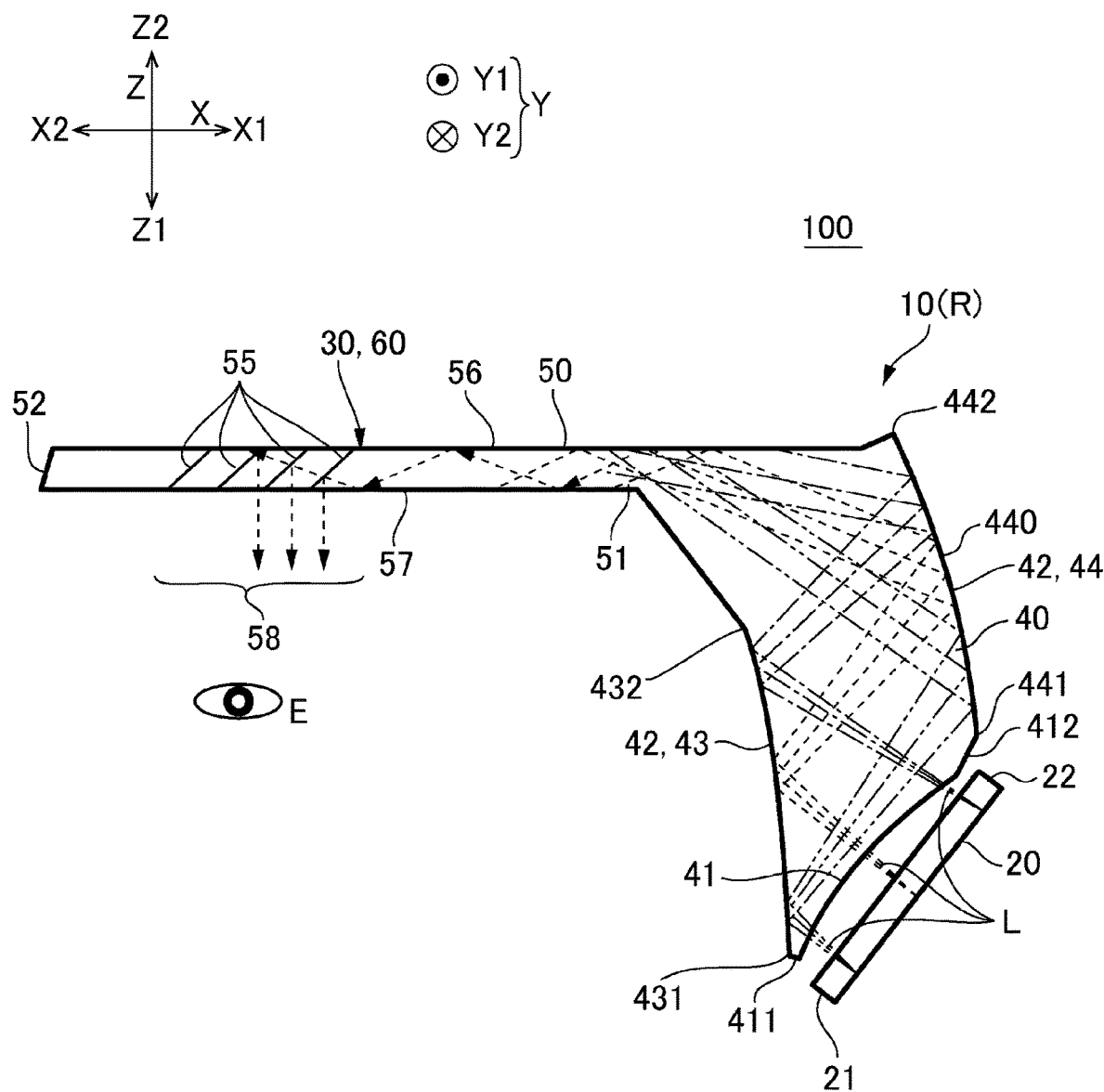
FIG. 7 is a plan diagram of the optical system of the display apparatus according to a fifth.

FIG. 7 is a plan diagram of the optical system of the display apparatus 100 according to a fifth embodiment. As illustrated in FIG. 7, similar to the first embodiment, the display unit 10 according to the present embodiment includes the image generation system 20 that emits image light beams L as non-parallel light beams and the light guide system 30 through which the image light beams L emitted from the image generation system 20 are incident without passing through a projection lens system and are guided to the light-emitting portion. The light guide system 30 includes the transparent light-incident portion 40 including the light-incident surface 41 and the plurality of reflection surfaces 42, and the transparent light guide portion 50 of which one end side in the first direction X (end portion 51 in one side X1) is connected to the light-incident portion 40, the light-incident surface 41 on which the image light beams L are incident and which is made of a curved surface, and the plurality of reflection surfaces 42 which convert the image light beams L incident from the light-incident surface 41 into parallel light beams and which are made of curved surfaces.

In the display apparatus 100 with this configuration, although the light-incident surface 41 and the image generation system 20 substantially face with each other in the first direction X in the first embodiment, in the present embodiment, the light-incident surface 41 and the image generation system 20 face with each other in an oblique direction intersecting both of the first direction X and the second direction Z. More specifically, the image generation system 20 is disposed obliquely such that the end portion 21 thereof in one side Z1 of the second direction Z is positioned toward the other side X2 of the first direction X than the other end portion 22 thereof in the other side Z2 of the second direction Z is. In addition, in the light-incident portion 40, the light-incident surface 41 is disposed obliquely such that the end portion 411 in one side Z1 of the second direction Z is positioned toward the other side X2 of the first direction X than the end portion 412 in the other side Z2 of the second direction Z is. The first light-reflective curved surface 43 is a surface which is slightly inclined toward the other side X2 of the first direction X, and the end portion 431 in one side X1 of the first direction X is positioned toward one side Z1 of the second direction Z than the end portion 432 in the other side X2 of the first direction X is. The first light-reflective curved surface 43 is a concave-shaped free curved surface. The second light-reflective curved surface 44 is a surface which is slightly inclined toward one side X1 of the first direction X, and the end portion 441 in one side X1 of the first direction X is positioned toward one side Z1 of the second direction Z than the end portion 442 in the other side X2 of the first direction X is. The second light-reflective curved surface 44 is a convex-shaped free curved surface. In addition, the second light-reflective curved surface 44 is provided with a reflective metal layer 440 including aluminum, silver, magnesium, chromium, or the like as a main component.

Even in the light-incident portion 40 with this configuration, similar to the first embodiment, when the image light beams L as non-parallel light beams emitted from the image generation system 20 are incident on the light-incident surface 41, the image light beams L incident from the light-incident surface 41 are directed toward the first light-reflective curved surface 43. Next, the image light beams L are reflected by the first light-reflective curved surface 43, and are directed again toward the second light-reflective curved surface 44. Next, the image light beams L are reflected by the second light-reflective curved surface 44 toward the light guide portion 50, and the image light beams L are converted into parallel light beams in the meantime. Even in the present embodiment, similar to the second, third, and fourth embodiments, a configuration in which at least a portion of the light-incident portion 40 is formed of the first transparent member 61 and the light guide portion 50 is formed of the second transparent member 62 which is surface-bonded to the first transparent member 61, may be adopted.

Sixth Embodiment

Figure 8:
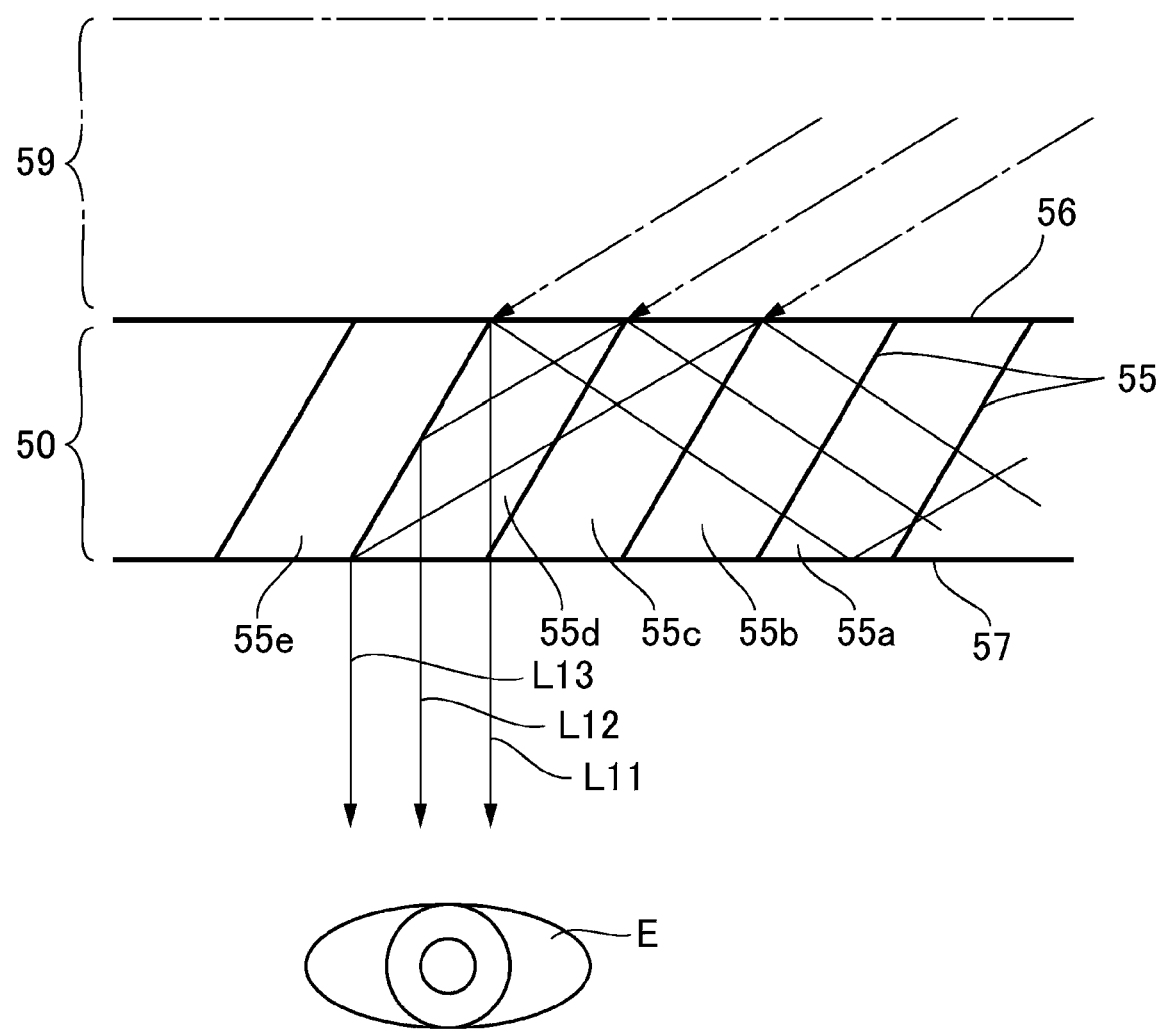
FIG. 8 is an explanatory diagram of the light guide portion of the display apparatus according to a sixth embodiment.

FIG. 8 is an explanatory diagram of the light guide portion 50 of the display apparatus 100 according to a sixth embodiment. In the present embodiment, the partial reflection layer 55 formed in the light guide portion 50 illustrated in FIG. 8 has a characteristic in that a transmittance and a reflectance change according to the incident angle. In the present embodiment, each of the plurality of partial reflection layers 55 has a larger reflectance when the incident angle is large than when the incident angle is small.

In the present embodiment, an angle formed by the partial reflection layer 55 and the second surface 57 is 45° to 70°. In addition, when the incident angle with respect to the partial reflection layer 55 is small, the transmittance is 98% or more, and the reflectance is 2% or less. On the other hand, when the incident angle with respect to the partial reflection layer 55 is large, the transmittance is 77%, and the reflectance is 23%. In this configuration, as described with reference to Tables 1, 2 and 3, a variation in brightness of the image light beams L emitted from each position of the light-emitting portion 58 in the first direction X can be reduced. More specifically, although light-emitting intensity of the image light beams L decreases in the light-emitting portion 58 as a distance from the light-incident portion 40 increases in the first direction X, according to the present embodiment, the decrease in the light-emitting intensity can be suppressed.

TABLE 1

| LIGHT-EMITTING POSITION | LIGHT BEAM | NUMBER OF TRANSMISSIONS TRANSMITTANCE OF 77% AT LARGE INCIDENT ANGLE | NUMBER OF TRANSMISSIONS TRANSMITTANCE OF 98% AT SMALL INCIDENT ANGLE | NUMBER OF REFLECTIONS AT LARGE INCIDENT ANGLE AND REFLECTANCE OF 23% | BRIGHTNESS (%) |
|---|---|---|---|---|---|
| PORTION 55a | L11 | 0 | 0 | 1 | 23.0 |
|  | L12 | 0 | 0 | 1 | 23.0 |
|  | L13 | 0 | 0 | 1 | 23.0 |
| PORTION 55b | L11 | 0 | 1 | 1 | 22.5 |
|  | L12 | 1 | 0 | 1 | 17.7 |
|  | L13 | 1 | 0 | 1 | 17.7 |

TABLE 1-continued

| LIGHT-EMITTING POSITION | LIGHT BEAM | NUMBER OF TRANSMISSIONS | | NUMBER OF REFLECTIONS | BRIGHTNESS (%) |
|---|---|---|---|---|---|
| | | TRANSMITTANCE OF 77% AT LARGE INCIDENT ANGLE | TRANSMITTANCE OF 98% AT SMALL INCIDENT ANGLE | AT LARGE INCIDENT ANGLE AND REFLECTANCE OF 23% | |
| PORTION 55c | L11 | 0 | 2 | 1 | 22.1 |
| | L12 | 1 | 1 | 1 | 17.4 |
| | L13 | 2 | 0 | 1 | 13.6 |
| PORTION 55d | L11 | 0 | 3 | 1 | 21.6 |
| | L12 | 1 | 2 | 1 | 17.0 |
| | L13 | 2 | 1 | 1 | 13.4 |
| PORTION 55e | L11 | 1 | 3 | 1 | 16.7 |
| | L12 | 1 | 3 | 1 | 16.7 |
| | L13 | 2 | 2 | 1 | 13.1 |

TABLE 2

| LIGHT-EMITTING POSITION | LIGHT BEAM | NUMBER OF TRANSMISSIONS AT TRANSMITTANCE OF 77% | NUMBER OF REFLECTIONS AT REFLECTANCE OF 23% | BRIGHTNESS (%) |
|---|---|---|---|---|
| PORTION 55a | L11 | 0 | 1 | 23.0 |
| | L12 | 0 | 1 | 23.0 |
| | L13 | 0 | 1 | 23.0 |
| PORTION 55b | L11 | 1 | 1 | 17.7 |
| | L12 | 1 | 1 | 17.7 |
| | L13 | 1 | 1 | 17.7 |
| PORTION 55c | L11 | 2 | 1 | 13.6 |
| | L12 | 2 | 1 | 13.6 |
| | L13 | 2 | 1 | 13.6 |
| PORTION 55d | L11 | 3 | 1 | 10.5 |
| | L12 | 3 | 1 | 10.5 |
| | L13 | 3 | 1 | 10.5 |
| PORTION 55e | L11 | 4 | 1 | 8.1 |
| | L12 | 4 | 1 | 8.1 |
| | L13 | 4 | 1 | 8.1 |

TABLE 3

| LIGHT-EMITTING POSITION | LIGHT BEAM | NUMBER OF TRANSMISSIONS AT TRANSMITTANCE OF 77% | NUMBER OF REFLECTIONS AT REFLECTANCE OF 23% | BRIGHTNESS (%) |
|---|---|---|---|---|
| PORTION 55a | L11 | 0 | 1 | 23.0 |
| | L12 | 0 | 1 | 23.0 |
| | L13 | 0 | 1 | 23.0 |
| PORTION 55b | L11 | 0 | 1 | 23.0 |
| | L12 | 1 | 1 | 17.7 |
| | L13 | 1 | 1 | 17.7 |
| PORTION 55c | L11 | 0 | 1 | 23.0 |
| | L12 | 1 | 1 | 17.7 |
| | L13 | 2 | 1 | 13.6 |
| PORTION 55d | L11 | 0 | 1 | 23.0 |
| | L12 | 1 | 1 | 17.7 |
| | L13 | 2 | 1 | 13.6 |
| PORTION 55e | L11 | 0 | 1 | 23.0 |
| | L12 | 1 | 1 | 17.7 |
| | L13 | 2 | 1 | 13.6 |

For example, in a case where the brightness (light-emitting intensity) of the light beams emitted from each portion between the partial reflection layers 55 illustrated in FIG. 8 is calculated, as shown in a result of Table 1, a variation in brightness of the image light beams L emitted from each position of the light-emitting portion 58 in the first direction X can be reduced. Table 1 shows the number of transmissions and the number of reflections until the image light beams L are emitted from portions 55a, 55b, 55c, 55d, and 55e between the partial reflection layers 55. The number of reflections when the image light beams L are finally reflected at a large incident angle is shown. On the other hand, in a case where the incident angle is large and a case where the incident angle is small, there is a difference in the number of transmissions. In the present embodiment, the transmittance at the partial reflection layer 55 differs depending on the incident angle. Therefore, the number of transmissions is shown by being divided into a case where the incident angle is large and a case where the incident angle is small. In addition, among the light beams emitted from the portions 55a, 55b, 55c, 55d, and 55e illustrated in FIG. 8, Table 1 shows brightness of the light beam L11 emitted from the portion positioned closest to one side X1 of the first direction X, the light beam L12 emitted from the portion positioned at the center in the first direction X, and the light beam L13 emitted from the portion positioned closest to the other side X2 of the first direction X.

As can be seen from Table 1, the brightness in each of the portions 55a, 55b, 55c, 55d, and 55e is from 13.1% to 23%, and a variation in brightness is small. In addition, a variation in brightness of the light beams L11, L12, and L13 emitted from each of the portions 55a, 55b, 55c, 55d, and 55e is small. On the other hand, in a case where the transmittance at the partial reflection layer 55 is 77% or more and the reflectance at the partial reflection layer 55 is 23% regardless of the incident angle with respect to the partial reflection layer 55, the brightness of each of the light beams L11, L12, and L13 emitted from each of the portions 55a, 55b, 55c, 55d, and 55e is shown in Table 2. As can be seen from Table 2, the brightness of each of the light beams L11, L12, and L13 emitted from each of the portions 55a, 55b, 55c, 55d, and 55e is from 8.1% to 23%, and a variation in brightness is large.

In addition, as illustrated in FIG. 8, in a case where a light-transmitting layer 59 in which the partial reflection layers 55 are not formed is provided on the light guide portion 50, in which the partial reflection layers 55 are formed, on the other side X2 of the first direction X, the number of transmissions through the partial reflection layers 55 can be reduced. Therefore, in a case where the transmittance at the partial reflection layer 55 is 77% or more and the reflectance at the partial reflection layer 55 is 23% regardless of the incident angle with respect to the partial reflection layer 55, the brightness of each of the light beams L11, L12, and L13 emitted from each of the portions 55a, 55b, 55c, 55d, and 55e is shown in Table 3. As can be seen from Table 3, the brightness of each of the light beams L11, L12, and L13 emitted from each of the portions 55a, 55b, 55c, 55d, and 55e is from 13.1% to 23%, and a variation in brightness is small. Here, in this case, the thickness of the light guide system 30 in the first direction X is increased by the provision of the light-transmitting layer 59.

Therefore, as in the present embodiment, instead of providing the light-transmitting layer 59 (refer to FIG. 8) in which the partial reflection layers 55 are not formed, the light guide portion 50 is formed only by the portion in which the partial reflection layers 55 are formed, and thus, even in a case where the thickness of the light guide portion 50 is decreased, it is possible to reduce a difference in brightness of the image light beams L emitted from a position of the light-emitting portion 58 away from the light-incident portion 40 in the first direction X. In addition, a variation in brightness of the light beams L11, L12, and L13 emitted from each of the portions 55a, 55b, 55c, 55d, and 55e can be reduced. Further, since unnecessary reflection at the partial reflection layers 55 is reduced, it is possible to suppress a deterioration in display quality due to occurrence of ghost.

Seventh Embodiment

In the sixth embodiment, the partial reflection layer 55 has a larger reflectance when the incident angle with respect to the partial reflection layer 55 is large than when the incident angle with respect to the partial reflection layer 55 is small. On the other hand, for example, in a case where an angle formed by the partial reflection layer 55 and the second surface 57 is 25° to 40°, a configuration in which the partial reflection layer 55 has a larger reflectance when the incident angle with respect to the partial reflection layer 55 is small than when the incident angle with respect to the partial reflection layer 55 is large, may be adopted.

Eighth Embodiment

Figure 9:
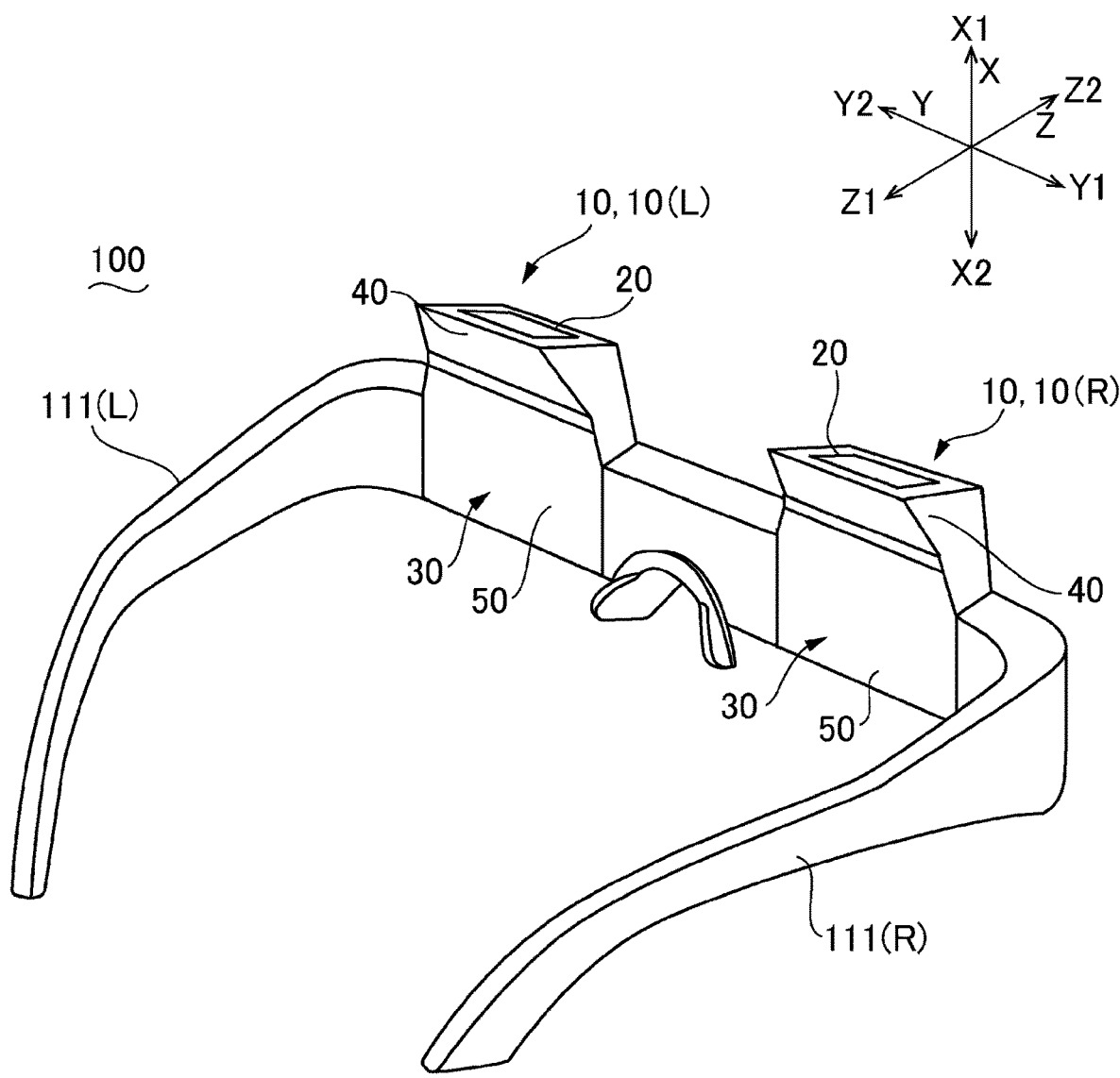
FIG. 9 is an explanatory view schematically illustrating an example of an appearance of the display apparatus according to a seventh embodiment.
Figure 10:
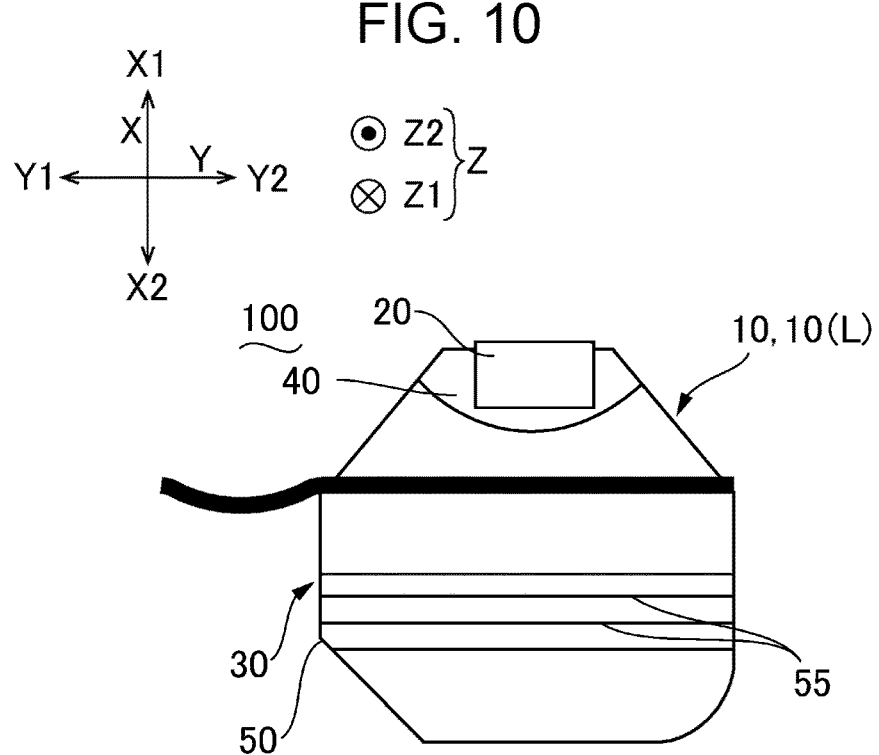
FIG. 10 is a front view of the display apparatus illustrated in FIG. 9 when viewed from a front direction of an observer.
Figure 11:
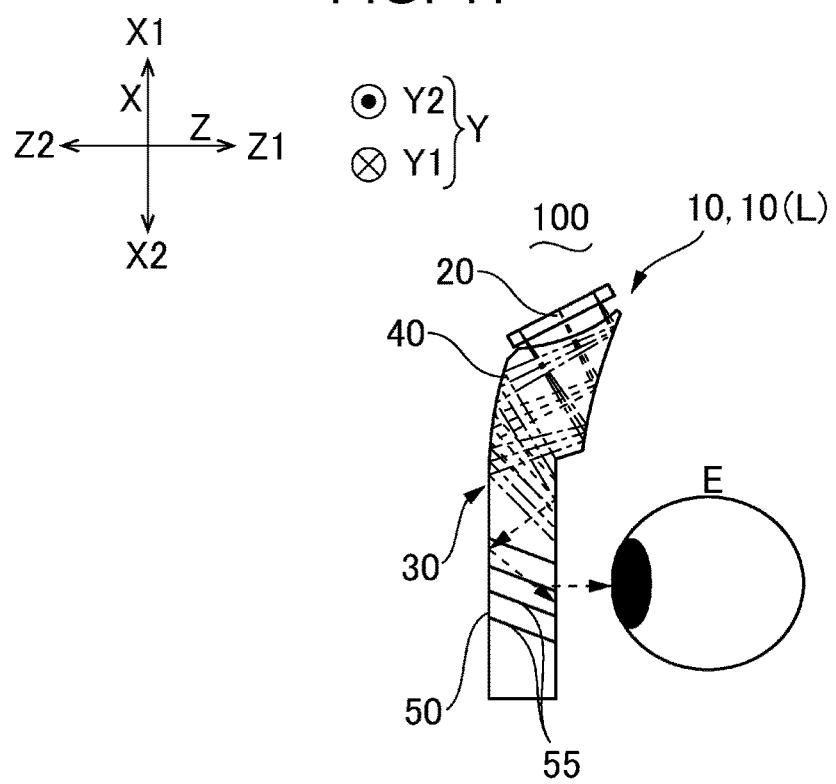
FIG. 11 is a side view of the display apparatus illustrated in FIG. 9 when viewed from a left side.

FIG. 9 is an explanatory view schematically illustrating an example of an appearance of the display apparatus 100 according to an eighth embodiment. FIG. 10 is a front view of the display apparatus 100 illustrated in FIG. 9 when viewed from a front direction of the observer. FIG. 11 is a side view of the display apparatus 100 illustrated in FIG. 9 when viewed from a left side. In the display apparatus 100 according to the first embodiment, the image generation system 20 and the light-incident portion 40 are disposed on an ear side, and the image light beams L are guided from the ear side toward a nose side. On the other hand, in the present embodiment, as illustrated in FIGS. 9, 10, and 11, the image generation system 20 and the light-incident portion 40 are disposed in front of the eye and above the eye, and the light guide portion 50 extends from an upper side toward a lower side. Thus, the image light beams L are guided from the upper side toward the lower side, and are emitted toward the eye. Therefore, in the present embodiment, an upper-lower direction corresponds to the first direction X, a front-rear direction corresponds to the second direction Z, and a right-left direction corresponds to the third direction Y. In addition, one side X1 of the first direction X corresponds to the upper side, and the other side X2 of the first direction X corresponds to the lower side.

Manufacturing Method of Light Guide Portion 50

Figure 12:
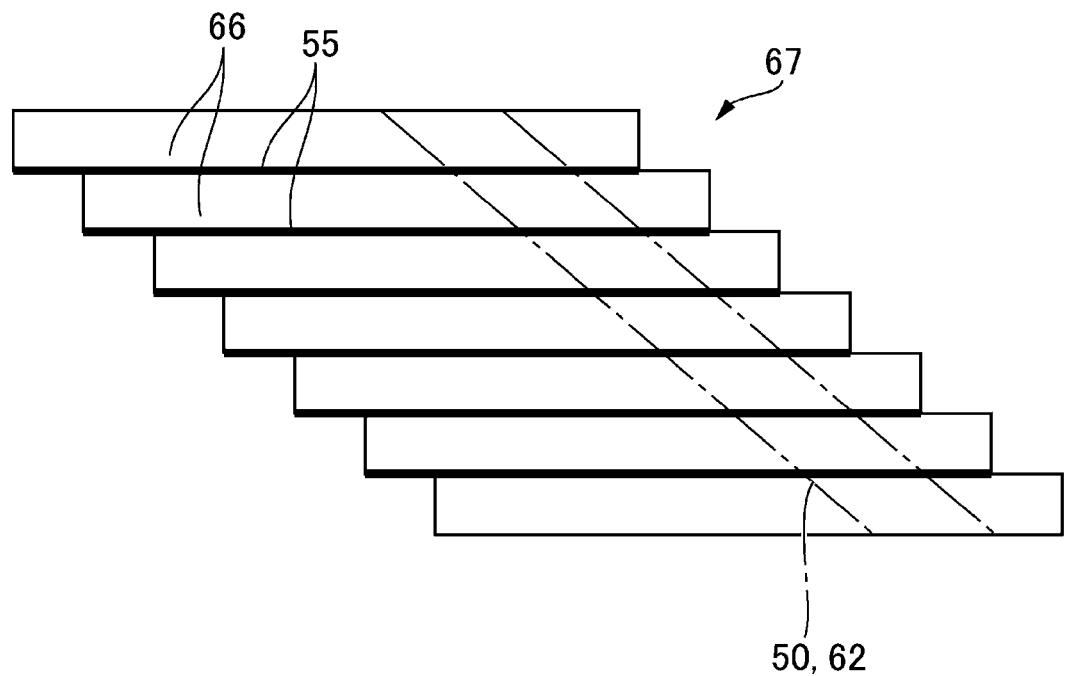
FIG. 12 is an explanatory diagram illustrating a manufacturing method of the light guide portion illustrated in FIG. 5.
Figure 13:
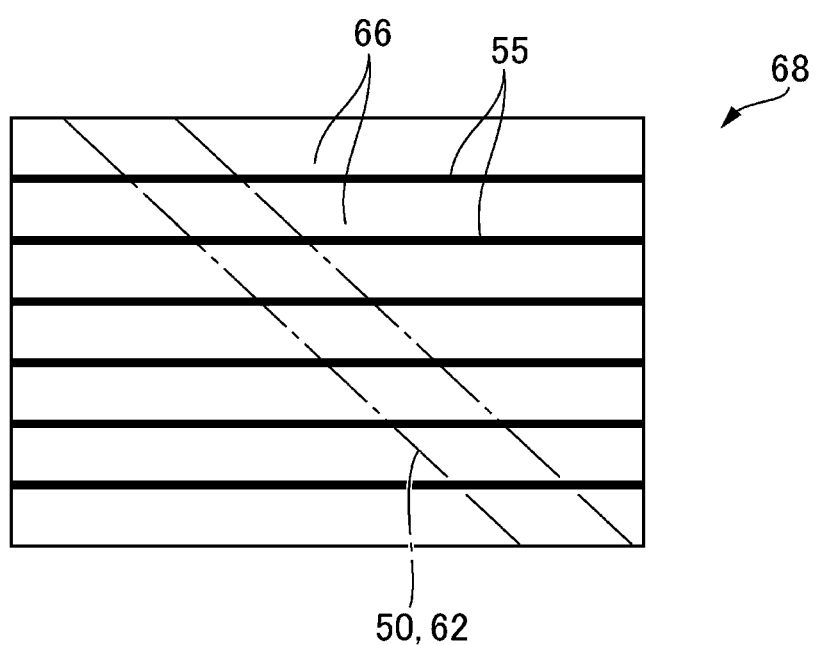
FIG. 13 is an explanatory diagram illustrating another manufacturing method of the light guide portion illustrated in FIG. 5.

FIG. 12 is an explanatory diagram illustrating a manufacturing method of the light guide portion 50 illustrated in FIG. 5. FIG. 13 is an explanatory diagram illustrating another manufacturing method of the light guide portion 50 illustrated in FIG. 5. In order to manufacture the light guide portion 50 (second transparent member 62) illustrated in FIG. 5, as illustrated in FIG. 12, a plurality of transparent substrates 66, each of which includes the partial reflection layer 55 formed on one side thereof, are overlapped while being shifted, and in this state, the transparent substrates 66 are bonded to each other via a bonding layer while applying a load to the transparent substrates 66, thereby forming a stacked body 67. At this time, the transparent substrates 66 on which the partial reflection layers 55 are not formed are also stacked. Next, the stacked body 67 is cut obliquely. As a result, the light guide portion 50 (second transparent member 62) is obtained. At this time, since the first surface 56 and the second surface 57 are formed by cut surfaces, polishing or the like is performed on the cut surfaces. The transparent substrates 66 are glass substrates, quartz substrates, resin substrates, or the like. In a case where the transparent substrates 66 are glass substrates, the transparent substrates 66 are bonded to each other by glass bonding or the like, and thus there is no need to use an adhesive. In addition, the transparent substrates 66 may be bonded to each other using an adhesive.

On the other hand, in a method illustrated in FIG. 13, a plurality of transparent substrates 66, each of which includes the partial reflection layer 55 formed on one side thereof, are overlapped without being shifted, and in this state, the transparent substrates 66 are bonded to each other via a bonding layer while applying a load to the transparent substrates 66, thereby forming a stacked body 68. At this time, the transparent substrates 66 on which the partial reflection layers 55 are not formed are also stacked. Next, the stacked body 68 is cut obliquely. As a result, the light guide portion 50 (second transparent member 62) is obtained. At this time, since the first surface 56 and the second surface 57 are formed by cut surfaces, polishing or the like is performed on the cut surfaces. The transparent substrates 66 are glass substrates, quartz substrates, resin substrates, or the like. In a case where the transparent substrates 66 are glass substrates, the transparent substrates 66 are bonded to each other by glass bonding or the like, and thus there is no need to use an adhesive. In addition, the transparent substrates 66 may be bonded to each other using an adhesive.

According to the method illustrated in FIG. 12, it is possible to reduce a loss in material. On the other hand, in the method illustrated in FIG. 13, since the plurality of transparent substrates 66 are entirely overlapped, when curing the adhesive while applying a load to the transparent substrates 66, by the method illustrated in FIG. 12, a uniform load is applied to the entire transparent substrates 66. Therefore, the transparent substrates 66 can be bonded to each other in a state of being in close contact with each other uniformly.

Other Embodiments

In the embodiments described above, although the image light beams are emitted from the light-emitting portion 58 of the light guide portion 50 by partial reflection on the plurality of partial reflection layers 55, the embodiment may be applied to the display apparatus 100 (display unit 10) with a configuration in which a diffraction element is provided in the light-emitting portion 58 and the image light beams are emitted by the diffraction element.

In the embodiments described above, an anti-reflection film may be provided on the first surface 56 or the second surface 57. Even in a case where light beams from the outside (see-through light beams) are transmitted or a case where the image light beams L are emitted from the light guide portion 50 to the outside, when reflection occurs at an interface between the light guide portion 50 and the light-incident portion 40, a loss in the light beams occurs due to the reflection. Therefore, by providing the anti-reflection film, it is possible to increase the brightness for both of the see-through light beams and the image light beams L. In addition, an amount of unnecessary return light beams can be decreased, and thus occurrence of ghost can be suppressed.

The entire disclosure of Japanese Patent Application No. 2017-062396, filed Mar. 28, 2017 is expressly incorporated by reference herein.

What is claimed is:

1. A display apparatus comprising:
an image generation system that emits image light beams as non-parallel light beams; and
a light guide system on which the image light beams emitted from the image generation system are incident without passing through a projection lens system,
wherein the light guide system including:
a transparent light-incident portion that includes a light-incident surface on which the image light beams are incident and the light-incident surface is a curved surface, and a plurality of reflection surfaces which convert the image light beams incident from the light-incident surface into parallel light beams and each of the plurality of reflection surfaces is curved surface; and
a transparent light guide portion of which one end side in a first direction is connected to the light-incident portion,
wherein the light guide portion including:
a first surface that extends from the one end side toward another end side in the first direction; and
a second surface that faces the first surface on one side of a second direction intersecting with the first direction,
the light guide portion has a light-emitting portion that is provided at a portion of the second surface away from the light-incident portion, and
wherein the parallel light beams emitted from the light-incident portion to the light guide portion are reflected between the first surface and the second surface, and are guided to the light-emitting portion.

2. The display apparatus according to claim 1,
wherein, when viewed from a third direction intersecting with the first direction and the second direction, a parallel light flux which is converted from a non-parallel light flux which is incident on the light-incident surface from the same portion of the image generation system by the light-incident portion fills the inside of a portion of the light guide portion on the one end side.

3. The display apparatus according to claim 2,
wherein the first surface and the second surface are parallel to each other, and
wherein, assuming that a light flux diameter of the parallel light flux when viewed from the third direction is D, that a distance between the first surface and the second surface in the second direction is t, and that an incident angle of the parallel light flux with respect to the first surface and the second surface is θ, the light flux diameter D, the distance t, and the incident angle θ satisfy the following conditional equation.

$D = 2t \times \sin \theta$

4. The display apparatus according to claim 2,
wherein the first surface and the second surface are parallel to each other, and
wherein, when viewed from the third direction, the parallel light flux including:
a first light beam which is incident on the second surface and is positioned at one end portion of the parallel light flux;
a second light beam which is incident on the second surface and is positioned at another end portion of the parallel light flux; and
a center light beam which is positioned at center of the parallel light flux,
a position of the first light beam incident on the second surface is positioned on a normal line which is normal to the first surface and is extended from a position of the center light beam incident on the first surface.

5. The display apparatus according to claim 1,
wherein at least one surface of the light-incident surface and the plurality of reflection surfaces is a free curved surface.

6. The display apparatus according to claim 1,
wherein at least one surface among the plurality of reflection surfaces includes a reflective metal layer.

7. The display apparatus according to claim 1,
wherein the light-incident portion and the light guide portion are configured with an integrated member.

8. The display apparatus according to claim 1,
wherein at least a portion of the light-incident portion is formed of a first transparent member, and
wherein the light guide portion is formed of a second transparent member which is surface-bonded to the first transparent member via a bonding surface.

9. The display apparatus according to claim 8,
wherein a first end portion of the bonding surface in the one side of the second direction is positioned between the second surface and a reflection region of the light-incident portion, and a second end portion of the bonding surface in another side of the second direction is positioned between the first surface and the reflection region of the light-incident portion.

10. The display apparatus according to claim 8,
wherein the first transparent member and the second transparent member have refractive indexes and Abbe numbers different from each other,
wherein the bonding surface is made of a curved surface, and
wherein the bonding surface is included in the light-incident portion.

11. The display apparatus according to claim 8,
wherein the first transparent member and the second transparent member have refractive indexes and Abbe numbers different from each other,
wherein the bonding surface is made of a flat surface, and
wherein the bonding surface is positioned between the light-incident portion and the light guide portion.

12. The display apparatus according to claim 1,
wherein the image generation system includes an optical modulation panel which generates an image and a lens element which is fixed on a surface of the optical modulation panel from which the image light beams are emitted.

13. The display apparatus according to claim 1,
wherein the light guide portion includes a plurality of partial reflection layers which are disposed parallel to each other along the first direction,
each of the partial reflection layer of the plurality of partial reflection layers being inclined toward the one end side from a normal direction of the second surface when viewed from a third direction intersecting with the first direction and the second direction, and
wherein the light-emitting portion is a portion of the second surface that overlaps with the plurality of partial reflection layers in the first direction.

14. The display apparatus according to claim 13,
wherein at least one partial reflection layer among the plurality of partial reflection layers includes a multi-layer film including a reflective metal layer.

15. The display apparatus according to claim 13,
wherein the plurality of partial reflection layers have a characteristic in which a reflectance changes according to an incident angle of an incident light beam.

16. The display apparatus according to claim 15,
wherein each of the plurality of partial reflection layers has a larger reflectance when the incident angle is large than when the incident angle is small.

17. The display apparatus according to claim 15,
wherein each of the plurality of partial reflection layers has a larger reflectance when the incident angle is small than when the incident angle is large.

\* \* \* \* \*